United States Patent [19]

Narula et al.

[11] Patent Number: 4,929,703
[45] Date of Patent: May 29, 1990

[54] SOLVENTLESS SILICONE COATING COMPOSITION

[75] Inventors: Dipak B. Narula; Anh Be, both of Midland County; Terence J. Swihart, Bay County, all of Mich.

[73] Assignee: Dow Corning Corporation, Midland, Mich.

[21] Appl. No.: 330,540

[22] Filed: Mar. 30, 1989

[51] Int. Cl.$^5$ ............................................. C08G 77/06
[52] U.S. Cl. ........................................ 528/23; 528/33; 528/34; 528/15; 528/17; 528/18; 528/19; 525/477
[58] Field of Search ....................... 528/33, 34, 23, 15, 528/17, 18, 19; 525/477

[56] References Cited

U.S. PATENT DOCUMENTS

| 3,624,030 | 11/1969 | Pruvost et al. | 260/46.5 |
| 3,846,358 | 9/1973 | Roedel | 260/18 S |
| 4,113,665 | 9/1978 | Law et al. | 260/37 SB |
| 4,160,858 | 7/1979 | Roedel | 528/14 |
| 4,508,887 | 4/1985 | Kohl | 528/21 |
| 4,780,338 | 10/1988 | Saad et al. | 427/387 |

FOREIGN PATENT DOCUMENTS

| 2345923 | 3/1975 | Fed. Rep. of Germany . |
| 2067212 | 1/1980 | United Kingdom . |

*Primary Examiner*—Melvyn I. Marquis
*Attorney, Agent, or Firm*—Alexander Weitz

[57] ABSTRACT

There are disclosed solventless silicone coating compositions comprising a homogeneous mixture of (A) a liquid silicone resin reaction product prepared by hydrolyzing an equilibrated mixture of (i) a first silane and (ii) a first diorganopolysiloxane, (B) a second silane and (C) a second diorganopolysiloxane. The compositions find utility as protective coatings, particularly in corrosion resistant high temperature paint applications. Coatings having excellent humidity resistance are formed when the compositions of the present invention are further modified with a minor portion of an amine-functional polydimethylsiloxane.

22 Claims, No Drawings

SOLVENTLESS SILICONE COATING COMPOSITION

BACKGROUND OF THE INVENTION

The present invention relates to a solventless silicone coating composition. More particularly, the present invention relates to a curable blend of a liquid silicone resin, a silane and a diorganopolysiloxane and finds utility as a high temperature coating composition, especially when low emission of organic volatiles is desired.

Silicone resins having trifunctional siloxy units and difunctional siloxy units are well known in the art and have been used extensively in the formulation of paints, varnishes, molding compounds and encapsulating compositions. Typically, these resins contain residual hydroxyl functionality, and occasionally residual alkoxy functionality, which may be condensed by means of heat and/or catalysis in order to cure the resins. Resins of this type are generally utilized in the form of solutions in organic solvents since they are often solids, or, at best, very viscous liquids at ordinary temperatures.

Thus, for example. U.S. Pat. No. 3,846.358 to Roedel discloses a process for producing a solid silicone resin by a complex sequence comprising partially hydrolyzing and alkoxylating an organohalosiloxane mixture with an alcohol and water, adding more alcohol, removing the acid formed by distillation adjusting the acidity of the intermediate adding additional water and alcohol and finally adjusting the solids content.

In U.S. Pat. No. 4,160,858, Roedel discloses a similar process for producing a solventless silicone resin having a viscosity of 200 to 5,000 cP at 25° C. wherein an alkali metal hydroxide is employed to reduce the acidity and excess alcohol and water are stripped off in a final step.

Silicone resins may also be prepared directly from alkoxysilanes and polysiloxanes, as shown in U.S. Pat. No. 4,113,665 to Law et al. which teaches binder compositions for chemically resistant coatings. These binder resins are formed by reacting a trialkoxysilane with an aliphatic polyol and/or a silicone intermediate having hydroxyl or alkoxy terminal groups and a molecular weight of about 500 to 2,000 in the presence of an aqueous acidic solution.

Solventless silicone coating compositions are disclosed by Saad et al. in U.S. Pat. No. 4,780,338. In this invention, a silicone resin containing hydroxy, alkoxy or acyloxy functionality is blended with a diorganopolysiloxane fluid having functional groups which react with the alkoxy or acyloxy groups of the silicone resin and a condensation catalyst to cure the composition.

GB No. 2,067,212 A to Toray Silicone Company discloses room temperature curing silicone resins comprising hydroxy-functional organopolysiloxane resin, low molecular weight hydroxyl-terminated diorganopolysiloxane and an organosilane having 2 or 3 hydrolyzable groups, or a partial hydrolysis product thereof. These compositions can be cured using tin or titanate catalysts.

The use of various acids and bases as catalysts in the polymerization of silanol-terminated siloxanes is known in the art. In this regard, perfluoroalkyl sulfonic acids, inter alia, have been utilized to promote the condensation of silanol-functional siloxanes to form high molecular weight fluids, gums and copolymers. In U.S. Pat. No. 4,508,887. Kohl discloses a method for preparing a polyorganosiloxane by reacting an inert medium mixture of at least one hydroxyl containing organosiloxane in the presence of a catalytically effective amount of a catalyst consisting essentially of an amine salt of an acid and an unreacted acid selected from fluorinated alkanesulfonic acids or sulfuric acid.

Such acids have also found utility as catalysts during the partial hydrolysis of chlorosilane mixtures. German Laid Open publication DT No. 2,345,923 Al to Bayer AG discloses chlorine-functional fluids and resins prepared by the partial hydrolysis of various chlorosilanes in the presence of perfluoroalkyl sulfonic acids.

SUMMARY OF THE INVENTION

None of the above recited references teaches the preparation of stable, low viscosity, alkoxy-functional, 100% reactive silicone coating compositions of the present invention. These compositions are particularly suitable in modern coating applications since they meet current Environmental protection Agency "Rule 24" requirements for volatile organic compounds (VOC) emission. Moreover, it has been discovered that the instant compositions may be modified by the addition of an amine-functional polydimethylsiloxane to augment the humidity resistance of the resulting cured coating.

The present invention therefore relates to a solventless silicone coating composition comprising (A) 100 parts by weight of a liquid silicone resin composition prepared by a process comprising
(I) reacting a mixture consisting essentially of
(i) a first silane having the average general formula

$$R^1{}_a Si(OR)_{4-a}$$

wherein R is selected from the group consisting of methyl, ethyl, propyl and acetyl radicals, $R_1$ is a monovalent hydrocarbyl group selected from the group consisting of phenyl and alkyl radicals having 1 to 3 carbon atoms and a is 1 to 2,
(ii) a first diorganopolysiloxane, having organic groups independently selected from the group consisting of phenyl, vinyl, alkyl radicals having 1 to 4 carbon atoms and halogenated alkyl radicals having 1 to 4 carbon atoms and
(iii) an equilibrating amount of an acid catalyst having the formula

$$ZSO_3H$$

wherein Z is a perfluoroalkyl group having 1 to about 10 carbon atoms, the molar ratio of said silane (i) to said diorganopolysiloxane ii being between about 1:1 and about 10:1,
(II) hydrolyzing the reaction product formed in step (I) with sufficient water to provide from about 0.5 to about 1 mole of residual —OR functionality per 100 parts by weight of said liquid silicone resin and
(III) neutralizing said acid catalyst (iii);
(B) from about 1 to 100 parts by weight of a second silane having the general formula

$$R^3 Si(OR)_3$$

wherein $R^3$ is selected from the group consisting of phenyl, vinyl, alkyl radicals having 1 to 4 carbon atoms and halogenated alkyl radicals having 1 to 4 carbon atoms and R has the definition set forth in (A)(I)(i) above; and (C) from about 1 to 200 parts by weight of a second diorganopolysiloxane having the average formula $$R^4O(R^5R^6SiO)_yR^4$$

wherein y is about 3 to 10, $R^4$ is selected from the group consisting of hydrogen and the above defined R groups and $R^5$ and $R^6$ are selected from the group consisting of phenyl, vinyl, alkyl radicals having 1 to 4 carbon atoms and halogenated alkyl radicals having 1 to 4 carbon atoms.

DETAILED DESCRIPTION OF THE INVENTION

The solventless silicone coating composition of the present invention comprises a homogeneous mixture of (A) a liquid silicone resin, (B) a silane and (C) a diorganopolysiloxane.

The liquid silicone resin (A) is a reaction product prepared by hydrolyzing, and then neutralizing, an equilibrated mixture of (i) an silane and (ii) a diorganopolysiloxane, the equilibration reaction being facilitated by a strong acid catalyst (iii).

Component (i) of liquid silicone resin (A) may be represented by the average general formula $$R^1_a Si(OR)_{4-a}$$

wherein R is selected from the group consisting of methyl, ethyl, propyl and acetyl radicals, $R^1$ is a monovalent hydrocarbyl group selected from the group consisting of phenyl and alkyl radicals having 1 to 3 carbon atoms and a is 1 to 2. The groups of R and $R^1$ may be selected independently. It is preferred that, in the above formula, a is 1, R is either a methyl or ethyl radical, and $R^1$ is selected from phenyl, methyl or ethyl radical. Particularly preferred alkoxysilanes are phenyltrimethoxysilane, phenylmethyldimethoxysilane, methyltrimethoxysilane and dimethyldimethoxysilane.

The diorganopolysiloxane (ii) of liquid silicone resin (A) may be a linear diorganopolysiloxane, the organic groups of which (herein denoted by $R^2$), are independently selected from the group consisting of phenyl, vinyl, alkyl radicals having 1 to 4 carbon atoms and halogenated alkyl radicals having 1 to 4 carbon atoms. Neither the molecular weight nor the selection of terminal groups of the diorganopolysiloxane (ii) is critical for the purpose of the present invention provided that an inert terminal group, such as trimethylsilyl, is not employed when the degree of polymerization of the diorganopolysiloxane ii is less than about 200. Thus, generic examples of suitable terminal groups include trialkylsilyl, alkoxydialkylsilyl, aryldialkylsilyl and hydroxydialkylsilyl groups. Specific terminal groups which may be used include $Me_3Si-$, $MeO(Me_2)Si-$ and $HO(Me_2)Si-$, wherein Me hereinafter denotes a methyl radical. preferably, the end group is $HO(Me_2)Si-$.

Specific examples of diorganopolysiloxane (ii) include the polymers and copolymers containing dimethylsiloxane, phenylmethylsiloxane, methylvinylsiloxane and methyltrifluoropropylsiloxane units. It is preferred that when component (ii) is a linear polydimethylsiloxane, that it be the dimethyl homopolymer.

Alternatively and preferably, diorganopolysiloxane (ii) is selected from at least one polydiorganocyclosiloxane having the formula $$(R^2_2SiO)_x$$

wherein x is an integer between 3 and about 10, inclusive and $R^2$ has been previously defined. Examples of such cyclic siloxanes include polydimethylcyclosiloxane, polymethylvinylcyclosiloxane and polyphenylmethylcyclosiloxane. For the purposes of the present invention, the preferred diorganopolysiloxane (ii) is a mixture of polydimethylcyclosiloxanes.

Component (iii) is a strong acid capable of efficiently redistributing (i.e., equilibrating) siloxane bonds. It has been observed that weak acids, such as phosphoric or acetic, do not redistribute siloxane bonds and therefore do not produce the liquid silicone resins of the present invention. Suitable acids are represented by the general formula $$ZSO_3H$$

wherein Z is a perfluoroalkyl group having 1 to about 10 carbon atoms. Examples of suitable acid catalysts include perfluoromethane sulfonic acid, perfluoroethane sulfonic acid, perfluorohexane sulfonic acid, perfluorooctane sulfonic acid and perfluorodecane sulfonic acid.

In order to prepare the liquid silicone resin (A), from about 1 to about 10 moles of silane (i) are first reacted with each mole of diorganopolysiloxane (ii), the preferred molar ratio of component (i) to component (ii) being about 1:1 to 2:1. The reaction is conducted under an inert atmosphere, such as nitrogen or argon, and is carried out in the presence of an equilibrating amount of catalyst (iii). The term "equilibrating amount" as used herein denotes a sufficient amount of acid catalyst (iii) to efficiently rearrange the siloxane bonds of reactants (i) and (ii) so as to provide a substantially equilibrated product of reaction within 3-5 hours at temperatures between about 60° and 80° C. This amount may readily be determined by those skilled in the art by following the disappearance of the reactants using, e.g., gas chromatography, the acid being neutralized before each such determination. Thus, for example, when the catalyst is the preferred perfluoromethane sulfonic acid, it is employed at about 0.04 to 0.1 weight percent of the total of components (i) and (ii). This amount of perfluoromethane sulfonic acid is sufficient to equilibrate the above mentioned components within about 4 hours at 70° C.

After equilibration of components (i) and (ii) is attained, the reaction product is hydrolyzed with sufficient water to provide from about 0.5 to about 1 mole of residual —OR functionality per 100 parts by weight of liquid silicone resin (A). As should be apparent to the skilled artisan, the molar units and weight units must, of course, be consistent (e.g., gram-moles and grams, respectively). The basic reactions relied upon to calculate the amounts of water to be used in the hydrolysis step are: (1) the hydrolysis of —OR groups on the above described equilibrated product to form silanol groups; and (2) condensation of the silanol groups to form siloxane bonds. The net effect of these reactions, assuming the complete condensation of all silanol groups formed, requires the employment of one half mole of water for the hydrolysis of each mole of —OR groups. Using this assumption, in combination with the above mentioned range of the ratio of silane (i) to diorganopolysiloxane (ii), one skilled in the art can readily calculate the approximate amounts of the ingredients to be used in forming the liquid silicone resin compositions having from about 0.5 to about 1 mole of residual —OR functionality per 100 parts by weight of said liquid silicone resin. In practice, it has been found that when R is methyl, the calculated (i.e., theoretical) methoxy content is generally within approximately 10 percent of the analytically determined value thereof. Preferably, when R is methyl, the final liquid silicone resin according to the present invention has from about 0.5 to 0.65 moles of residual methoxy functionality per 100 parts by weight of the resin, a value of about 0.58 being most preferred. The hydrolysis step may be carried out at temperatures between about 18° and 70° C., but preferably below the boiling point of the alcohol (e.g., MeOH) or acetic acid formed during the hydrolysis. This reaction should be carried out for at least one hour, whereupon the reactants are preferably heated to reflux and the alcohol or acetic acid formed is removed by distillation.

Finally, the acid catalyst is neutralized and the product stripped under vacuum to remove the remaining alcohol, or acetic acid, byproduct as well as other impurities. The product is then cooled and filtered.

It has been noted that the actual amount of residual —OR functionality left on the liquid silicone resin has been found to be critical in formulating the compositions of the present invention. For example, when less than about 0.5 moles of residual —OR functionality per 100 parts by weight of the liquid silicone resin remains (e.g., corresponding to approximately 15 weight percent methoxy), the compositions tend to gel upon storage under ordinary conditions. On the other hand, when the —OR content is above about 1 mole of residual —OR functionality per 100 parts by weight of said liquid silicone resin (e.g., corresponding to 30 weight percent methoxy), the liquid silicone resins have such a low molecular weight that they tend to evaporate at the elevated temperatures often employed in curing the compositions of the present invention.

Component (B) of the present invention is a second silane having the general formula $$R^3Si(OR)_3$$

wherein $R^3$ is selected from the group consisting of phenyl, vinyl, alkyl radicals having 1 to 4 carbon atoms and halogenated alkyl radicals having 1 to 4 carbon atoms and R has its previously defined meaning. It is preferred that $R^3$ of component (B) is selected from methyl or phenyl radicals and that R is selected from methyl or ethyl radicals.

Component (C) is a second diorganopolysiloxaue having the average formula $$R^4O(R^5R^6SiO)_yR^4$$

wherein y is about 3 to 10, $R^4$ is selected from the group consisting of hydrogen and the above defined R groups and $R^5$ and $R^6$ are independently selected from the group consisting of phenyl, vinyl, alkyl radicals having 1 to 4 carbon atoms and halogenated alkyl radicals having 1 to 4 carbon atoms. The preferred diorganopolysiloxane (C) is selected from hydroxyl endblocked polymers of phenylmethylsiloxane, dimethylsiloxane and vinylmethylsiloxane units, hydroxyl endblocked polyphenylmethyl siloxane being highly preferred.

It should be noted that, for the purposes of the present invention, the R groups of (i), (B) and (C) may be the same or different.

All the ingredients of the present invention described above are well known in the art, many being commercially available, and further description thereof is not considered necessary.

In order to prepare the solventless silicone coating compositions of the present invention, from about 1 to 100 parts by weight of silane (B) and from about 1 to 200 parts by weight of diorganopolysiloxane (C) are uniformly blended with 100 parts by weight of liquid silicone resin (A). The order of addition is not believed to be critical and the mixing may be carried out at ordinary temperatures provided a homogeneous solution or dispersion results which does not phase-separate upon standing.

Preferred embodiments of the present invention utilize phenyltrimethoxysilane and a mixture of polydimethylcyclosiloxanes in a mole ratio of about 2:1 for the preparation of the liquid silicone resin (A), trifluoromethane sulfonic acid being the preferred equilibration catalyst. One hundred parts by weight of this component (A) is then uniformly mixed with from about 10 to 50 parts by weight of either methyltrimethoxysilane or phenyltrimethoxysilane and from about 60 to 160 parts by weight of hydroxyl endblocked polyphenylmethylsiloxane having a degree of polymerization of about 3 siloxane units.

Highly preferred embodiments result when the compositions of the present invention include the further addition of about 1 to 3 parts by weight of (D) an amine-functional polydimethylsiloxane per 100 parts by weight of the solventless silicone coating composition (i.e., components (A) through (C), as described above). The amine-functional polydimethylsiloxane (D) may be a linear or branched structure in which an average of at least two amine groups are present for each 100 silicon atoms. Additionally, component (D) must have an average of two or more alkoxy groups having 1 to 3 carbon atoms in its molecule. Preferably, the alkoxy groups are methoxy. In such structures, the amine groups are attached to the siloxane chain through silicon-carbon-nitrogen bonds, while the alkoxy groups are attached directly to silicon atoms. The only other limitation on the nature of the amine-functional polydimethylsiloxane (D) is that it have a sufficiently low molecular weight so as to be compatible with the solventless silicone coating compositions of the present invention. Thus, for the purposes of the present invention, components (A) through (D) will not tend to form separate phases upon prolonged standing when mixed at the above described levels.

A preferred component (D) is a fluid consisting essentially of about 3 to 9 mole percent of units having the formula $$O_{3/2}SiCH_2CH_2CH_2NHCH_2CH_2NH_2$$

about 82 to 94 mole percent of linear dimethylsiloxane units and about 3 to 9 mole percent of units having the formula $$O_{3/2}SiMe.$$

These fluids are prepared by reacting the corresponding amine-functional alkoxysilane and methyltrialkoxysilane with the hydroxyl endblocked polydimethylsiloxane having a number average molecular weight of about 1,000 to 10,000. This reaction can be carried out at elevated or ambient temperatures and results in a fluid product having the required residual methoxy functionality.

Addition of such amine-functional polydimethylsiloxanes has been shown to greatly improve the humidity resistance of the cured coatings of the compositions of the present invention. Furthermore, their inclusion can also result in better adhesion of coatings cured at room temperature.

In addition to the above mentioned amine-functional polydimethylsiloxane (D), the compositions of the present invention may be blended with linear polydimethylsiloxanes. Addition of about 0.5 to 10 percent by weight of a polydimethylsiloxane having a viscosity of about 100 to 50,000 cS at 25° C. to the liquid silicone resins of the present invention results in compositions which exhibit reduced coefficients of friction (i e., slip) and improved release when coated and cured on a substrate. The preferred polydimethylsiloxanes have a viscosity of about 1,000 to 20,000 cS at 25° C. and are preferably added to the liquid silicone resins of the present invention at a level of about 1 to 2 weight percent.

Because the compositions of the present invention contain residual alkoxy or acetoxy functionality, they may be cured by exposure to atmospheric moisture. The cure is preferably hastened by the addition of catalysts known in the art to promote the hydrolysis of the —OR groups and subsequent condensation to form a three-dimensional siloxane network. Catalysts suitable for this purpose may be selected from the organotitanates, such as tetraisopropyl titanate and tetrabutyl titanate and organometallic compounds, such as dibutyltin dilaurate, tin octoate, dibutyltin diacetate, zinc octoate, cobalt octoate, cobalt naphthanate and cerium naphthanate. Typically, from about 1 to 10 parts by weight of the catalyst is employed for each 100 parts by weight of the solventless silicone coating composition.

The compositions of the present invention may further be compounded with various fillers, such as titanium dioxide, mica, iron oxide and aluminum flake, pigments, thermal stabilizers, flow agents and other additives commonly employed in the formulation of coating compositions.

The liquid silicone resin compositions of the present invention find utility in the preparation of protective coatings for metal, glass and plastic substrates, corrosion resistant high temperature paints, release coatings for bakeware, binders for masonry water repellant, decorative topcoat for appliances and tanks, and as a paper or fabric saturant in the manufacture of automotive gaskets, inter alia.

EXAMPLES

The following examples are presented to further illustrate the compositions of the present invention, but are not to be construed as limiting the invention, which is delineated in the appended claims. All parts and percentages in the examples are on a weight basis and measured properties were obtained at 25° C., unless indicated to the contrary.

The following materials were employed in the preparation of the illustrative and comparative examples:

LSR—A liquid silicone resin was prepared by mixing under a nitrogen purge 78 parts of phenyltrimethoxysilane and 14 parts of a mixture of polycyclosiloxanes having the formula $(Me_2SiO)_x$, wherein Me hereinafter denotes a methyl radical and x had a value between 3 and 10. The mixture was stirred and 0.05 parts of trifluoromethane sulfonic acid was added. The catalyzed mixture was then slowly heated to 70° C. and stirred at this temperature for about 4 hours. Upon cooling to about 34° C., 6.8 parts of deionized water was added. The resulting exothermic reaction brought the temperature of the mixture to about 70° C. Stirring was continued for about another hour without further application of heat. Powdered calcium carbonate (0.3 part) was added to neutralize the acid catalyst and a vacuum (about 40 mm Hg) was applied while slowly heating to about 156° C. This temperature was held for about 4 hours to strip off volatiles. The product was cooled and filtered using Celite filter aid. It had a residual methoxy functionality of about 18% (i.e., 0.58 moles —OMe per 100 grams of the LSR) and a viscosity of about 105 cP.

PTMS—Phenyltrimethoxysilane.

MTMS—Methyltrimethoxysilane.

SILICONE A—A silicone consisting essentially of a hydroxyl endblocked polymethylphenylsiloxane having a viscosity of about 500 cS and having the average formula

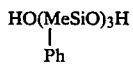

wherein Ph hereinafter denotes a phenyl radical.

SILICONE B—A mixture consisting essentially of a hydroxyl endblocked polydimethylsiloxane having a number average molecular weight of about 40,000 and cyclic polydimethylsiloxanes having from 4 to about 10 siloxane units, the mixture having a viscosity of about 13,500 cP.

SILICONE C—An amine-functional polydimethylsiloxane consisting essentially of a reaction product (at room temperature) of 10 parts methyltrimethoxysilane, 15 parts N-(beta-aminoethyl)-gamma-aminopropyltrimethoxysilane and 75 parts hydroxyl endblocked polydimethylsiloxane fluid having a viscosity of about 40 cP.

TBT—Tetra(n-butyl) titanate catalyst. TIPT—Tetra(isopropyl) titanate catalyst.

DBTDA—Dibutyltin diacetate.

ZO—An 8% solution of zinc octoate catalyst in Rule 66 mineral spirits.

CO—An 6% solution of cobalt octoate catalyst in Rule 66 mineral spirits.

The following test methods were utilized in characterizing the materials described infra:

Pencil Hardness—ASTM Test Method D 3363.

Solvent Resistance—The ball end of a 24 ounce ball-peen hammer were wrapped With eight layers of cheesecloth. After saturating the cheesecloth with a given solvent, the covered ball was drawn back and forth over a coated panel (double rub) until the panel surface was exposed. Only the weight of the hammer was applied during the test and the number of such double rubs was reported.

Slip Angle—An indication of coefficient of friction, this test basically consisted of placing a cheesecloth-covered weight (500 grams on the coated panel and tilting the panel. The angle of incline (from the horizontal) at which this weight started to slide was recorded.

Heat Resistance—Coated panels were placed in an air oven at the indicated temperature. After a given time, the panels were allowed to cool to room temperature and examined, the criterion for failure being cracking of the coating.

Release—About 5 grams of a commercial cookie mix were placed on a coated panel and heated in an air oven at the indicated time and temperature. Upon cooling, the cookies were scraped off and the ease of release was determined according to the following scale:

5 = No sticking, no residue
4 = No sticking, some residue
3 = Minor sticking or much residue
2 = Moderate sticking
1 = Extreme sticking Cleveland Humidity Resistance—The coated side of a steel panel was exposed to 100% RH at 70° C. (the interior of the humidity chamber) while the other side faced ambient temperature. The coated side was examined every 24 hours and the time at which it appeared hazy, rusted or blistered was taken as an indication of failure.

Corrosion Resistance—ASTM B117—73. Salt spray chamber contained 5% NaCl and was operated at 35° C. Failure was indicated when rust or delamination extended ⅛ inch on either side of the scribe line.

Chemical Resistance—Five drops of a given chemical were placed on the surface of a cured coating and covered with a watchglass having a diameter of 4 cm. After 24 hours at room temperature, the coating (on a panel) was rinsed with water and the effect of the chemical recorded according to the following rating scheme:

5 = No effect
4 = Slight color change or blisters
3 = Moderate color change or blisters (or up to 10% film loss)
2 = Severe color change or blisters (or 11% to 30% film loss)
1 = Between 31% and 75% film loss
0 = Greater than 75% film loss Cross-Cut Adhesion—ASTM 3359.
60 Degree Gloss—ASTM D523

The aforementioned ASTM (American Society for Testing and Materials) test methods are well known in the art and said methods are hereby incorporated by reference.

EXAMPLES 1-5

Homogeneous blends of LSR, SILICONE A, and MTMS were prepared at room temperature in the proportions shown in Table 1. In each case, 100 parts of the blend was catalyzed with 5 parts of TBT to form a uniform coating composition. Cleaned steel panels were spray coated with the compositions and the coated panels were dried at room temperature and then heated for 30 minutes at 150° C. in order to cure the compositions. Physical properties of the blends as well as cured films are presented in Table 1.

TABLE 1

| | Example | | | | |
|---|---|---|---|---|---|
| | 1 | 2 | 3 | 4 | 5 |
| Parts LSR | 47.5 | 50.0 | 25.0 | 75.0 | 45.0 |
| Parts SILICONE A | 47.5 | 25.0 | 50.0 | 12.5 | 45.0 |
| Parts MTMS | 5.0 | 25.0 | 25.0 | 12.5 | 10.0 |
| Coating Composition | | | | | |
| Viscosity (#2 Zahn cup) (sec) | 31 | 16 | 16 | 20 | 24 |
| % Solids (1 hour/150° C.) | 90 | 72 | 73 | 82 | 86 |
| Cured Film Properties | | | | | |
| Film Thickness (Mil) | 0.61 | 0.55 | 0.44 | 0.57 | 0.37 |
| Pencil Hardness | H | 2H | H | H | F |
| Solvent Resistance (Double Rubs): Methylethyl ketone | 75 | 75 | 50 | 150 | 35 |

COMPARATIVE EXAMPLES 6-9

Blends similar to those of Examples 1-5 were prepared and tested as shown in Table 2. In each case, adequate coatings could not be produced using the TBT catalyst. The compositions of (Comparative) Examples 6 and 7 had too low viscosities to use in the spray apparatus while (Comparative) Examples 8 and 9 did not cure upon heating.

Similar poor results were obtained when the catalyst was changed to 2.5 parts each of TBT and CO per 100 parts of the coating composition.

Additionally, the cured coating of Example 5 passed a one hour heat resistance test at 700° F. of while a cured coating based on only LSR composition catalyzed with TBT failed completely flaked and cracked off panel).

TABLE 2

| | (Comparative) Example | | | |
|---|---|---|---|---|
| | 6 | 7 | 8 | 9 |
| Parts LSR | 2.5 | 12.5 | 2.5 | 12.5 |
| Parts SILICONE A | 2.5 | 12.5 | 95.0 | 75.0 |
| Parts MTMS | 95.0 | 75.0 | 2.5 | 12.5 |
| Coating Composition | | | | |
| Viscosity (#2 Zahn cup) (sec) | 14 | 14 | 85 | 25 |
| % Solids (1 hour/150° C.) | 7 | 24 | 96 | 83 |

EXAMPLES 10-13

The blends of the present invention shown in Table 3 were prepared, cured as above and films on steel panels were evaluated. These coatings showed extremely low initial slip angle and release performance comparable to the best currently available cookie sheet coatings.

TABLE 3

| | Example | | | |
|---|---|---|---|---|
| | 10 | 11 | 12 | 13 |
| Parts LSR | 55.0 | 55.0 | 70.0 | 70.0 |
| Parts SILICONE A | 22.5 | 22.5 | 15.0 | 15.0 |
| Parts MTMS | 22.5 | 22.5 | 15.0 | 15.0 |
| Parts TBT Catalyst | 4.0 | 4.0 | 4.0 | 4.0 |
| Parts ZO Catalyst | — | 1.25 | — | 1.25 |
| Parts CO Catalyst | 1.25 | — | 1.25 | — |
| Parts Solvent* | 7.0 | 6.7 | 16.1 | 15.4 |
| Coating Composition | | | | |
| % Solids (1 hour/150° C.) | 72 | 72 | 70 | 69 |
| Cured Film Properties (Initial) | | | | |
| Film Thickness (Mil) | 0.3 | 0.25 | 0.25 | 0.3 |
| Pencil Hardness | 3H | 3H | 2H | 2H |
| Solvent Resistance (Double Rubs): | | | | |
| CLOROX Bleach | 45 | 45 | 40 | 70 |
| Slip Angle (degrees) | 4 | 4 | 4 | 4 |
| Cured Film Properties (After 8 hours at 600° F.) | | | | |
| Pencil Hardness | 4H | 4H | 4H | 3H |
| Release Rating (Cookie Mix) | 3 | 4 | 5 | 5 |
| Slip Angle (degrees) | 10 | 14 | 15 | 15 |

*Solvent = blend of VM & P naphtha, toluene and isobutyl isobutyrate in the ratio of 15:4:10, respectively.

EXAMPLES 14-15

Two coating compositions of the present invention were prepared, as above, to illustrate the benefit of including an amine-functional fluid (SILICONE C) in the formulation. It can be seen from Table 4 that the inclusion of this fluid significantly improves the Cleveland humidity performance of the cured coatings.

TABLE 4

|  | Example 14 | | Example 15 | |
| --- | --- | --- | --- | --- |
| Parts LSR | 45 | | 45 | |
| Parts SILICONE A | 45 | | 45 | |
| Parts MTMS | 10 | | 10 | |
| Parts SILICONE C | — | | 2 | |
| Parts TIPT | 7.5 | | 7.5 | |
| Parts DBTDA | 2.5 | | 2.5 | |
| Cured Film Properties | Oven Cure* | R.T. Cure | Oven Cure* | R.T. Cure |
| Pencil Hardness | H | B | H | F |
| Solvent Resistance (Double Rubs): | | | | |
| Methylethyl ketone | 140 | 30 | 200 | 84 |
| Corrosion Resisitance (hours) | 1000 | 750 | 1000 | 450 |
| Cleveland Humidity (hours) | 96 | 70 | 2000 | 475 |

*Oven Cure = 150° C. for 30 minutes in air oven.
R.T. Cure = room temperature for 72 hours.

EXAMPLES 16–17

The coating compositions shown in Table 5 were prepared, as before, by blending the components to obtain a homogeneous mixture.

TABLE 5

|  | Example 16 | Example 17 |
| --- | --- | --- |
| Parts LSR | 45 | 45 |
| Parts SILICONE A | 45 | 45 |
| Parts MTMS | 10 | — |
| Parts PTMS | — | 10 |

Each of the above coating compositions was formulated into a black paint according of the following composition:

| 53.7 parts | Coating Composition |
| --- | --- |
| 11.5 parts | FERRO 6331 pigment (Ferro Corp., Cleveland, OH) |
| 20.2 parts | MICA C-3000 (English Mica Co., Kings Mountain, NC) |
| 5.2 parts | SYLOID 74 (W. R. Grace, Baltimore, MD) |
| 9.5 parts | TIPT Catalyst |
| 100.1 | |

The paints were prepared using a PREMIER MILL DISPERSATOR at 3500 r.p.m./15 minutes and were then diluted with VM & P naphtha to obtain a final viscosity of 30 seconds with a #2 Zahn cup. The catalyst was added to the other components within eight hours of preparation. After being spray painted with the black paint, steel panels were air dried for 15 minutes and then cure at about 150° C. for 30 minutes. Characteristics of the cured coatings are shown in Table 6.

In a similar fashion, white paints were prepared from the above coating compositions:

| 42.5 parts | Coating Composition |
| --- | --- |
| 50.0 parts | R-960 titanium dioxide (E. I. DuPont; Wilmington; DE) |
| 7.5 parts | TIPT Catalyst |
| 100 | |

Cured coatings based on this white paint were also evaluated, as indicated in Table 6.

TABLE 6

|  | Example 16 | | Example 17 | |
| --- | --- | --- | --- | --- |
|  | Black | White | Black | White |
| Coating Thickness (Mils) | 1.0 | 1.6 | 1.1 | 1.3 |
| Pencil Hardness | F | F | F | F |
| 60 Degree Gloss (%) | 7 | 84 | 16 | 73 |
| Cross-Cut Adhesion (%) | 90 | 0 | 95 | 90 |
| Solvent Resistance (Double Rubs): | | | | |
| Toluene | 13 | 19 | 13 | 11 |
| VM & P naphtha | 96 | 140 | 131 | 99 |
| Chemical Resistance Rating: | | | | |
| 10% NaOH | 0 | 0 | 0 | 0 |
| Triethylamine | 4 | 1 | 4 | 2 |
| 10% HCl | 0 | 0 | 0 | 0 |
| 10% H$_2$SO$_4$ | 0 | 4 | 0 | 4 |
| 10% Acetic acid | 3 | 4 | 3 | 4 |
| NH$_4$OH (aqueous) | 5 | 5 | 5 | 5 |

We claim:
1. A composition comprising:
(A) 100 parts by weight of a liquid silicone resin prepared by a process comprising
  (I) reacting a mixture consisting essentially of
    (i) a first silane having the average general formula
    $$R^1{}_a Si(OR)_{4-a}$$

wherein R is selected from the group consisting of methyl, ethyl, propyl and acetyl radicals, $R^1$ is a monovalent hydrocarbyl group selected from the group consisting of phenyl and alkyl radicals having 1 to 3 carbon atoms and a is 1 to 2,
    (ii) a first diorganopolysiloxane, having organic groups independently selected from the group consisting of phenyl, vinyl, alkyl radicals having 1 to 4 carbon atoms and halogenated alkyl radicals having 1 to 4 carbon atoms and
    (iii) an equilibrating amount of an acid catalyst having the formula $$ZSO_3H$$

wherein Z is a perfluoroalkyl group having 1 to about 10 carbon atoms, the molar ratio of said silane (i) to said diorganopolysiloxane (ii) being between about 1:1 and about 10:1,
  (II) hydrolyzing the reaction product formed in step (I) with sufficient water to provide from about 0.5 to about 1 mole of residual —OR functionality per 100 parts by weight of said liquid silicone resin and
  (III) neutralizing said acid catalyst (iii);
(B) from about 1 to 100 parts by weight of a second silane having the general formula $$R^3 Si(OR)_3$$

wherein $R^3$ is selected from the group consisting of phenyl vinyl, alkyl radicals having 1 to 4 carbon atoms and halogenated alkyl radicals having 1 to 4 carbon atoms and R has the definition set forth in (A)(I)(i) above; and
(C) from about 1 to 200 parts by weight of a second diorganopolysiloxane having the average formula $$R^4 O(R^5 R^6 SiO)_y R^4$$

wherein y is about 3 to 10, $R^4$ is selected from the group consisting of hydrogen and the above defined R groups and $R^5$ and $R^6$ are selected from the group consisting of phenyl, vinyl, alkyl radicals having 1 to 4 carbon atoms and halogenated alkyl radicals having 1 to 4 carbon atoms.

2. The composition according to claim 1, wherein the R group of said silane (i), said silane (B) and said diorganopolysiloxane (C) is selected from the group consisting of methyl and ethyl radicals.

3. The composition according to claim 2, wherein $R^1$ of said silane (i) is selected from the group consisting of methyl and phenyl radicals.

4. The composition according to claim 3, wherein said diorganopolysiloxane ii is selected from the group consisting of linear polydimethylsiloxane and polydimethylcyclosiloxane.

5. The composition according to claim 4, wherein said silane (i) is phenyltrimethoxysilane.

6. The composition according to claim 5, wherein said diorganopolysiloxane (ii) is a mixture of polydimethylcyclosiloxanes.

7. The composition according to claim 6, wherein said acid catalyst (iii) is trifluoromethane sulfonic acid.

8. The composition according to claim 7, wherein said silane (B) is selected from the group consisting of phenyltrimethoxysilane and methyltrimethoxysilane.

9. The composition according to claim 8, wherein said diorganopolysiloxane (C) is selected from the group consisting of hydroxyl endblocked polydimethylsiloxane and hydroxyl endblocked polyphenylmethylsiloxane.

10. The composition according to claim 9, wherein the mole ratio of said silane (i) to said diorganopolysiloxane (ii) is is 1:1 to 2:1, said liquid silicone resin (A) has 0.48 to 0.65 mole of residual —OR functionality per 100 parts by weight of said liquid silicone resin and said diorganopolysiloxane (C) is hydroxyl endblocked polyphenylmethylsiloxane.

11. The composition according to claim 10, wherein about 10 to 50 parts by weight of said silane (B) and about 60 to 160 parts by weight of said diorganopolysiloxane (C) are utilized for each 100 parts by weight of said liquid silicone resin (A).

12. The composition according to claim 11, comprising the further addition of about 1 to 3 parts by weight for each 100 parts by weight of said composition of an amine-functional polydimethylsiloxane having at least two amine groups for each 100 silicon atoms thereof and having at least two alkoxy groups of 1 to 3 carbon atoms in its molecule, said amine-functional polydimethylsiloxane being compatible with said composition.

13. The composition according to claim 12, wherein said amine-functional polydimethylsiloxane is a reaction product of 10 parts by weight methyltrimethoxysilane, 15 parts by weight N-(beta-aminoethyl)-gamma-aminopropyltrimethoxysilane and 75 parts by weight hydroxyl endblocked polydimethylsiloxane fluid having a viscosity of about 40cP at 25° C.

14. A composition comprising:
(A) 100 parts by weight of a liquid silicone resin composition prepared by a process comprising
 (I) reacting a mixture consisting essentially of
  (i) a first silane having the average general formula $R^1{}_a Si(OR)_{4-a}$ wherein R is selected from the group consisting of methyl, ethyl, propyl and acetyl radicals, $R^1$ is a monovalent hydrocarbyl group selected from the group consisting of phenyl and alkyl radicals having 1 to 3 carbon atoms and a is 1 to 2, (ii) a first diorganopolysiloxane, having organic groups independently selected from the group consisting of phenyl, vinyl, alkyl radicals having 1 to 4 carbon atoms and halogenated alkyl radicals having 1 to 4 carbon atoms and
  (iii) an equilibrating amount of an acid catalyst, the molar ratio of said silane (i) to said diorganopolysiloxane (ii) being between about 1:1 and about 10:1,
 (II) hydrolyzing the reaction product formed in step (I) with sufficient water to provide from about 0.5 to about 1 mole of residual OR functionality per 100 parts by weight of said liquid silicone resin and
 (III) neutralizing said acid catalyst (iii);
(B) from about 1 to 100 parts by weight of a second silane having the general formula $R^3 Si(OR)_3$ wherein $R^3$ is selected from the group consisting of phenyl, vinyl, alkyl radicals having 1 to 4 carbon atoms and halogenated alkyl radicals having 1 to 4 carbon atoms and R has the definition set forth in (A)(I)(i) above;
(C) from about 1 to 200 parts by weight of a second diorganopolysiloxane having the average formula $R^4 O(R^5 R^6 SiO)_y R^4$ wherein y is about 3 to 10, $R^4$ is selected from the group consisting of hydrogen and the above defined R groups and $R^5$ and $R^6$ are selected from the group consisting of phenyl, vinyl, alkyl radicals having 1 to 4 carbon atoms and halogenated alkyl radicals having 1 to 4 carbon atoms; and
(D) from about 1 to 3 parts by weight for each 100 parts by weight of said components A), (B) and (C) of an amine-functional polydimethylsiloxane having at least two amine groups for each 100 silicon atoms thereof and having at least two alkoxy groups of 1 to 3 carbon atoms in its molecule, said amine-functional polydimethylsiloxane being compatible with said components (A), (B) and (C).

15. The composition according to claim 14, wherein the R group of said silane (i), said silane (B) and said diorganopolysiloxane (C) is selected from the group consisting of methyl and ethyl radicals.

16. The composition according to claim 15, wherein $R^1$ of said silane (i) is selected from the group consisting of methyl and phenyl radicals.

17. The composition according to claim 16, wherein said diorganopolysiloxane (ii) is selected from the group consisting of linear polydimethylsiloxane and polydimethylcyclosiloxane.

18. The composition according to claim 17, wherein said silane (i) is phenyltrimethoxysilane.

19. The composition according to claim 18, wherein said diorganopolysiloxane (ii) is a mixture of polydimethylcyclosiloxanes.

20. The composition according to claim 19, wherein said acid catalyst (iii) is trifluoromethane sulfonic acid.

21. The composition according to claim 20, wherein said silane (B) is selected from the group consisting of phenyltrimethoxysilane and methyltrimethoxysilane.

22. The composition according to claim 21, wherein said diorganopolysiloxane (C) is selected from the group consisting of hydroxyl endblocked polydimethylsiloxane and hydroxyl endblocked polyphenylmethylsiloxane.

* * * * *